US012623652B2

(12) United States Patent
Diamond et al.

(10) Patent No.:  US 12,623,652 B2
(45) Date of Patent:       May 12, 2026

(54) METHODS AND SYSTEM FOR HYBRID VEHICLE ADAPTIVE MOTOR UTILIZATION

(71) Applicant: Ford Global Technologies, LLC, Dearborn, MI (US)

(72) Inventors: Brendan Diamond, Naples, FL (US); Joseph F. Kucharski, Livonia, MI (US); Keith Weston, Canton, MI (US); Lars Niklas Pettersson, Novi, MI (US); Rajib Saha, Lasalle (CA); Andrew Brown, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 18/734,277

(22) Filed: Jun. 5, 2024

(65) Prior Publication Data

US 2025/0376147 A1     Dec. 11, 2025

(51) Int. Cl.
| | |
|---|---|
| *B60W 20/10* | (2016.01) |
| *B60W 10/06* | (2006.01) |
| *B60W 10/08* | (2006.01) |
| *B60W 10/18* | (2012.01) |

(52) U.S. Cl.
CPC ............ *B60W 20/10* (2013.01); *B60W 10/06* (2013.01); *B60W 10/08* (2013.01); *B60W 10/18* (2013.01); *B60W 2510/087* (2013.01); *B60W 2530/10* (2013.01); *B60W 2710/0666* (2013.01); *B60W 2710/083* (2013.01); *B60W 2710/244* (2013.01)

(58) Field of Classification Search
CPC ...... B60W 20/10; B60W 10/06; B60W 10/08; B60W 10/18; B60W 2510/087; B60W 2530/10; B60W 2710/0666; B60W 2710/083; B60W 2710/244
See application file for complete search history.

(56) References Cited

U.S. PATENT DOCUMENTS

| | | | |
|---|---|---|---|
| 5,343,970 | A | 9/1994 | Severinsky |
| 7,489,101 | B2 | 2/2009 | Bockelmann et al. |
| 9,327,589 | B2 | 5/2016 | Conlon et al. |
| 9,559,626 | B2 | 1/2017 | Lee |
| 10,601,359 | B2 | 3/2020 | Inokuma et al. |
| 2016/0001769 | A1* | 1/2016 | Kamioka ............... B60W 20/11 180/65.265 |
| 2023/0238911 | A1 | 7/2023 | Kobayashi et al. |

FOREIGN PATENT DOCUMENTS

KR          20090101015 A       9/2009

* cited by examiner

*Primary Examiner* — Navid Z. Mehdizadeh
*Assistant Examiner* — Matthew Ho
(74) *Attorney, Agent, or Firm* — McCoy Russell LLP

(57)                ABSTRACT

A method for operating a hybrid vehicle that operates in charge depletion and charge sustaining modes is described. In one example, fractions of driver demand power that are generated via an internal combustion engine and an electric machine are adjusted in response to a rate of change in electric machine temperature and/or predicted electric machine temperature.

7 Claims, 4 Drawing Sheets

METHODS AND SYSTEM FOR HYBRID VEHICLE ADAPTIVE MOTOR UTILIZATION

FIELD

The present description relates to methods and a system for adaptively controlling operation of an electric machine of a hybrid vehicle. The electric machine may slow or provide propulsive effort to the hybrid vehicle.

BACKGROUND

A hybrid vehicle may include an internal combustion engine and an electric machine to propel the hybrid vehicle. The electric machine may provide propulsive effort while the internal combustion engine is activated or deactivated. The electric machine and the internal combustion engine may operate according to predetermined operating conditions so that the internal combustion engine may operate near its most efficient operating conditions and fuel may be conserved. However, there may be times when operating the engine near its most efficient operating conditions may not be desirable. Therefore, it may be desirable to provide a way of operating an internal combustion engine and an electric machine in a way that allows the engine to deviate from baseline operation at times.

It may be understood that the background above is provided to give some context to the systems and methods described in the detailed description. The background is not meant to identify key features of the claimed subject matter, the scope of which is defined uniquely by the claims that follow the detailed description. Furthermore, the claimed subject matter is not constrained to implementations that solve any disadvantages noted in any part of this disclosure.

DETAILED DESCRIPTION

The present description is related to adapting utilization of an electric machine so that there may be less possibility of de-rating the electric machine. As a result, the electric machine may increase its assistance to the engine during high load conditions. One way to reduce a possibility of de-rating the electric machine may be to operate the internal combustion engine away from its baseline operating conditions where engine efficiency is higher. In particular, torque output of the engine may be increased over torque output of the engine at baseline operating conditions where the engine and the electric machine combine to generate a driver demand torque. Since the engine provides a greater fraction of the driver demand torque, there may be less possibility of the temperature of the electric machine reaching a temperature where the electric machine is de-rated.

Figure 1:
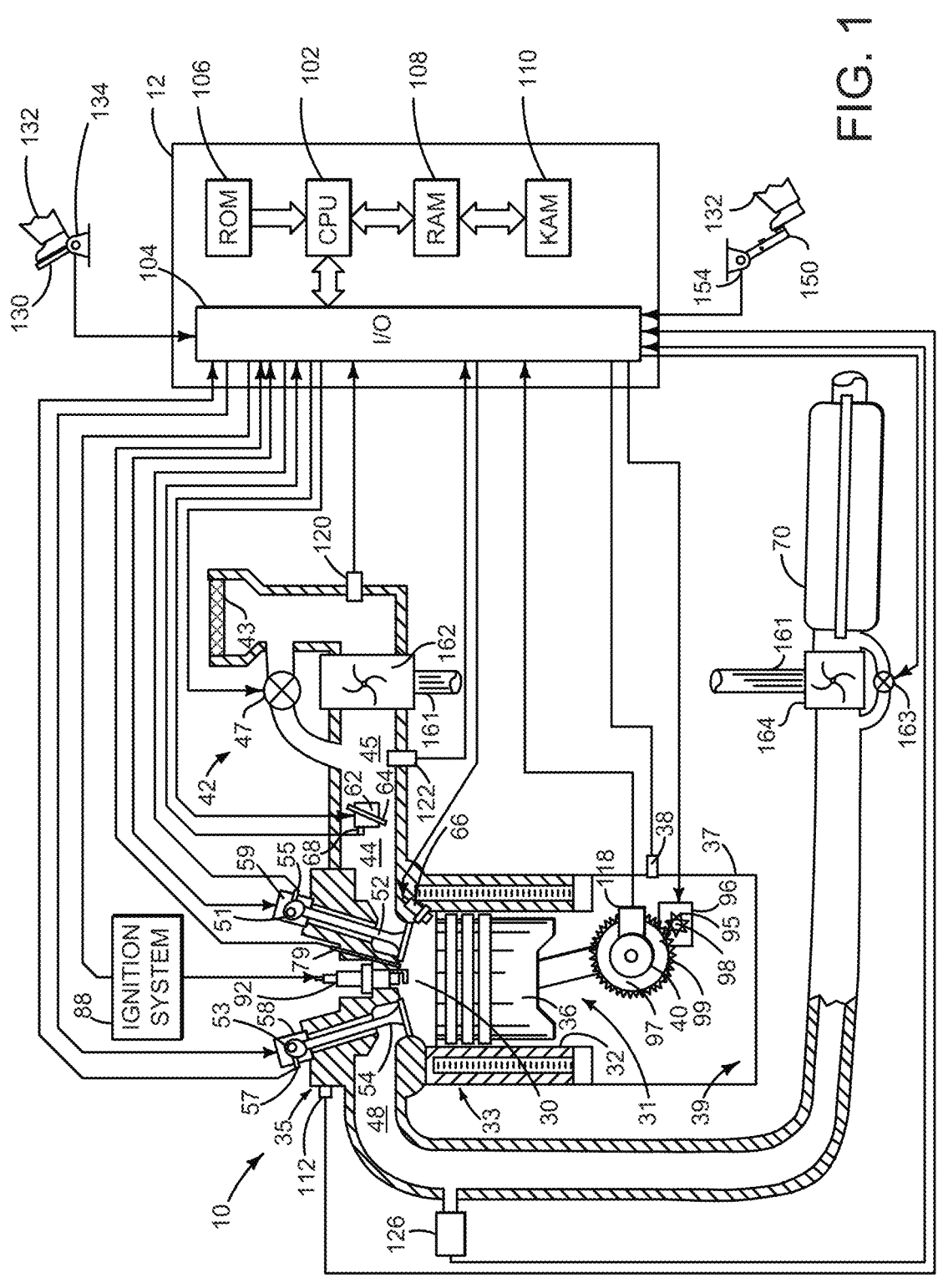
FIG. 1 shows a schematic diagram of an internal combustion engine.
Figure 2:
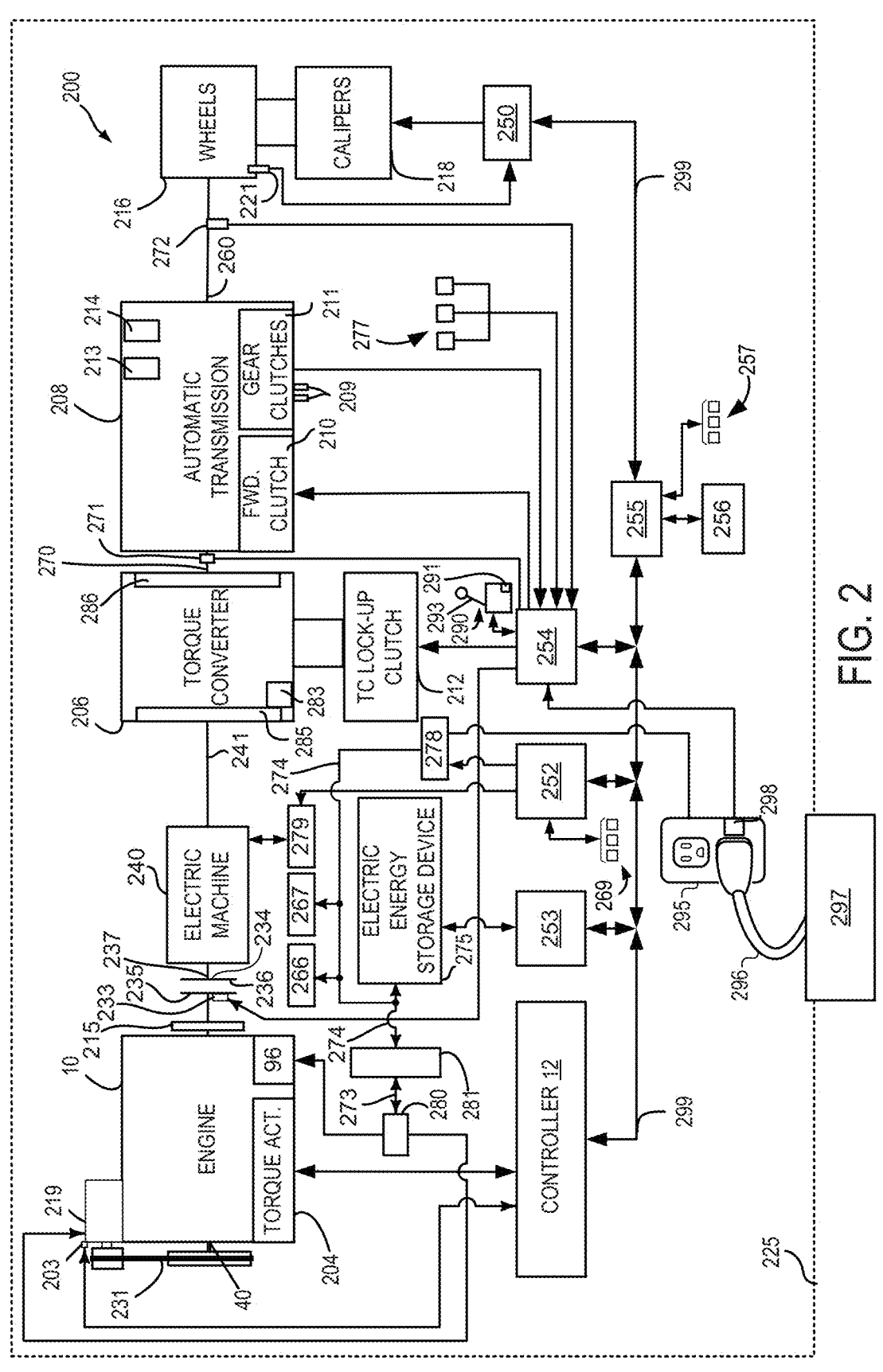
FIG. 2 shows a schematic diagram of an example vehicle driveline or powertrain including the internal combustion engine shown in FIG. 1.
Figure 3:
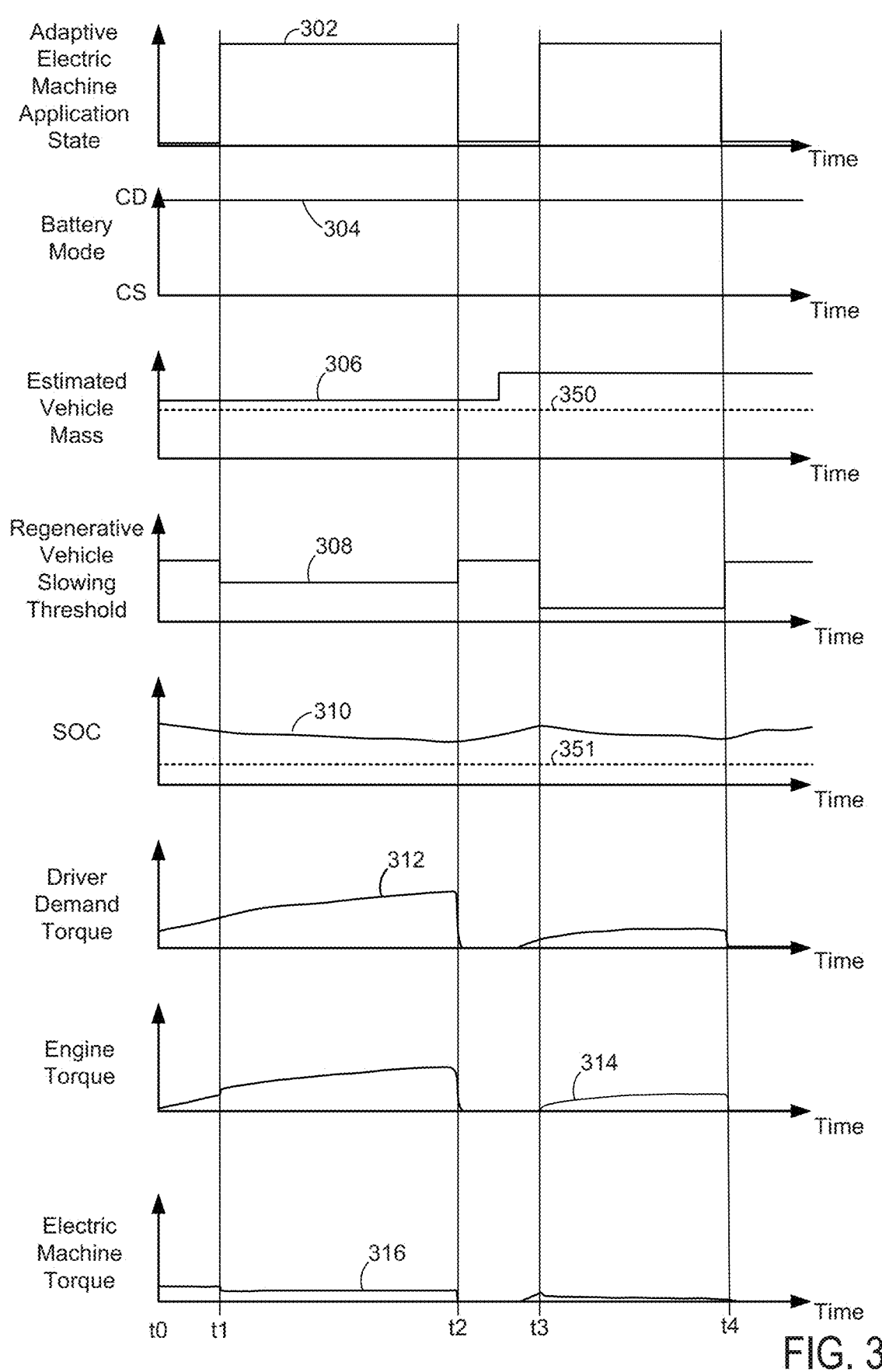
FIG. 3 shows an example vehicle operating sequence according to the method of FIG. 4.
Figure 4:
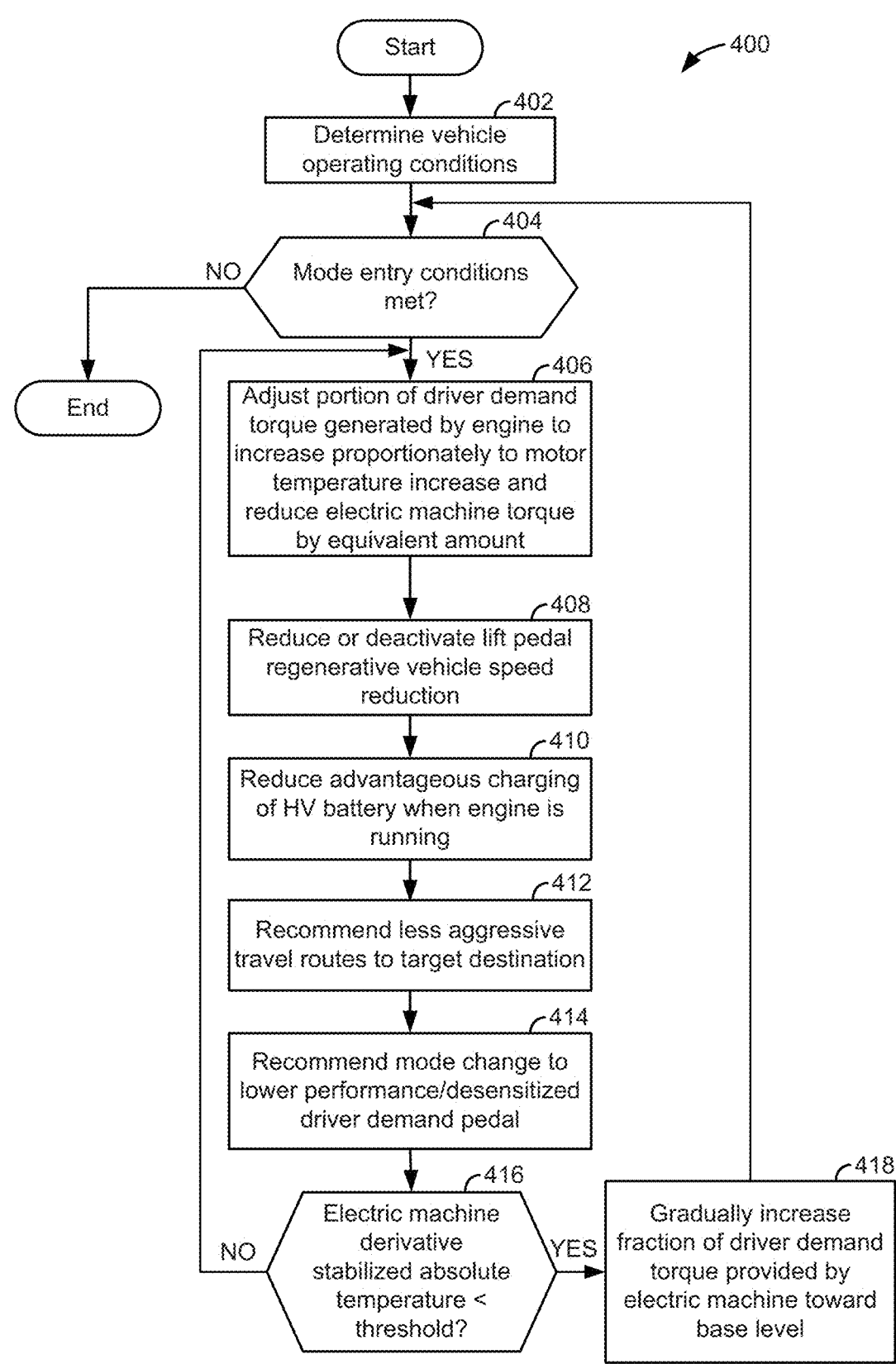
FIG. 4 shows a flowchart of an example method for adapting operation of an electric machine of a hybrid vehicle.

An internal combustion engine is shown in FIG. 1. The internal combustion engine of FIG. 1 is included in a driveline of a hybrid vehicle as shown in FIG. 2. The driveline may be operated according to the method of FIG. 4 as shown in the sequence of FIG. 3. A method for operating a vehicle is shown in FIG. 4.

A hybrid vehicle may include a relatively small displacement internal combustion engine so that the hybrid vehicle is fuel efficient when the engine is activated. The engine may be assisted by the hybrid vehicle's electric machine and the electric machine may be heavily utilized to ensure efficient vehicle operation. The electric machine may be useful to assist in propulsion when the vehicle is hauling a load (e.g., cargo) or towing a trailer. The electric machine may provide propulsion assistance when the vehicle is operating in a charge depletion mode where high voltage battery power is consumed or depleted. The electric machine may assist in vehicle to provide propulsive effort until the high voltage battery state of charge (SOC) is within a predetermined "sustain" range or until the electric machine is de-rated (e.g., the power output of the electric machine is constrained to be less than the rated output power of the electric machine by constraining electric power flow to the electric machine to be less than a maximum rated electric power flow to the electric machine at present electric machine operating conditions). If the electric power flow to the electric machine is constrained due to a temperature of the electric machine being greater than a threshold temperature, the hybrid vehicle may not be able to provide as much propulsive effort or vehicle slowing capability as may be desired.

The inventors herein have recognized the above-mentioned issues and have developed a method for operating a vehicle, comprising: increasing a first fraction of a driver demand torque generated via an internal combustion engine relative to a baseline fraction of torque generated via the internal combustion engine and decreasing a second fraction of the driver demand torque generated via an electric machine relative to a baseline fraction of torque generated via the electric machine in response to a driver demand torque increasing over a plurality of time intervals.

By increasing a first fraction of a driver demand torque generated via an internal combustion engine and decreasing a second fraction of the driver demand torque generated via the electric machine in response to a driver demand torque increasing over a plurality of time intervals, it may be possible to anticipate that an electric machine will reach a threshold temperature where the electric machine is de-rated. As such, output of the electric machine may be decreased and output of an internal combustion engine may be increased to meet driver demand torque so that the electric machine may remain at a lower temperature, or alternatively, so that the rate of electric machine temperature increase may be decreased. Thus, these control actions may prevent the electric machine from being de-rated so that it remains available to meet driver demand.

The present description may provide several advantages. Specifically, the approach may reduce a possibility of electric machine heating. Further, the approach allows driver demand to be achieved while controlling electric machine temperature. In addition, the approach may increase opportunities for regenerative vehicle slowing.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 31, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold

48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to a driver demand pedal 130 for sensing force applied by human foot 132; a position sensor 154 coupled to caliper application pedal 150 for sensing force applied by foot 152, a measurement of engine manifold pressure (MAP) from pressure sensor 122 coupled to intake manifold 44; an engine position sensor 118 sensing a position of crankshaft 40; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and friction caliper controller 250. The controllers may communicate over controller area network (CAN) 299. Each of the controllers may provide information to other controllers such as power output thresholds (e.g., power output of the device or component being controlled not to be exceeded), power input thresholds (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded friction calipers). Further, the vehicle system controller 255 may provide commands to engine controller 12, electric machine controller 252, transmission controller 254, and caliper controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle slowing. The requested desired wheel power may be provided by vehicle system controller 255 requesting a first vehicle slowing power from electric machine controller 252 and a second vehicle slowing power from engine controller 12, the first and second powers providing a desired driveline vehicle slowing power at vehicle wheels 216. Vehicle system controller 255 may also request a friction caliper power via caliper controller 250. The vehicle slowing powers may be referred to as negative powers since they slow driveline and wheel rotation. Positive power may maintain or increase a speed of driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and caliper controller 250. Alternatively, the vehicle system controller 255 and the engine controller 12 may be a single unit while the electric machine controller 252, the transmission controller 254, and the caliper controller 250 are standalone controllers.

In this example, powertrain 200 may be powered by engine 10 and electric machine 240. In other examples, engine 10 may be omitted. Engine 10 may be started with an engine starting system shown in FIG. 1, via an integrated starter/generator BISG 219, or via electric machine. A temperature of BISG windings may be determined via BISG winding temperature sensor 203. Electric machine 240 (e.g., high voltage (operated with greater than 30 volts) electrical machine) may also be referred to as a motor and/or a generator. Further, power of engine 10 may be adjusted via torque actuator 204, such as a fuel injector, throttle, etc.

BISG 219 is mechanically coupled to engine 10 via coupler 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Power converter 281 (e.g., a bi-directional DC/DC converter) may transfer electrical energy from a high voltage bus 274 to a low voltage bus 273 or vice-versa. Low voltage battery 280 is electrically directly coupled to low voltage buss 273. Low voltage bus 273 may be comprised of one or more electrical conductors. Electric energy storage device 275 (e.g., a high voltage battery or traction battery) is electrically coupled to high voltage bus 274. Positive temperature coefficient (PTC) electric heater 266 and electrically driven climate control system (e.g., a heat pump) 267 are also electrically coupled to high voltage bus 274 and may receive electric power via high voltage bus 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to electric machine input shaft 237.

Electric machine 240 may be operated to provide power to powertrain 200 or to convert powertrain power into electrical energy to be stored in electric energy storage device 275 in a regeneration mode (e.g., regenerative vehicle slowing where electric machine 240 reduces the vehicle speed via converting the vehicle's kinetic energy into electric energy). Electric machine 240 is in electrical communication with energy storage device 275 via inverter 279. Inverter 279 may convert direct current (DC) electric power from electric energy storage device 275 into alternating current (AC) electric power for operating electric machine 240. Alternatively, inverter 279 may convert AC power from electric machine 240 into DC power for storing in electric energy storage device 275. Inverter 279 may be controlled via electric machine controller 252 and electric machine controller 252 may receive sensor signals and/or data via sensors 269 (e.g., electric machine temperature sensors, electric machine current sensors, etc.). Electric machine 240 has a higher output power capacity than starter 96 shown in FIG. 1 or BISG 219. Further, electric machine 240 directly drives powertrain 200 or is directly driven by powertrain 200. There are no gears, or chains, or other couplers, to couple electric machine 240 to powertrain 200. Rather, electric machine 240 rotates at the same rate as powertrain 200. Electrical energy storage device 275 (e.g., high voltage battery or power source) may be a battery, capacitor, or inductor. The downstream side of electric machine 240 is mechanically coupled to the impeller 285 of torque converter 206 via shaft 241. The upstream side of the electric machine 240 is mechanically coupled to the disconnect clutch 236. Electric machine 240 may provide a positive power or a negative power to powertrain 200 via operating as a motor or generator as instructed by electric machine controller 252.

Power converter 278 (e.g., an inverter) is shown electrically coupled to electric energy storage device 275 via high voltage bus 274 and electrical output receptacle 295. Power converter 278 may convert DC power to AC power for operating external electric power consumer 297 (e.g., hand tools, entertainment systems, lighting, pumps, etc.). Power converter 278 may convert electric power from low voltage battery 280, electric power from electric energy storage device 275, or electric power from electric machine 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as electric machine 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction calipers 218. In one example, friction calipers 218 may be engaged in response to a human driver pressing their foot on a foot pedal (not shown) and/or in response to instructions within caliper controller 250. Further, caliper controller 250 may apply friction calipers 218 in response to information and/or requests made by vehicle system controller 255. In the same way, a frictional force may be reduced to wheels 216 by disengaging friction calipers 218 in response to the human driver releasing their foot from a caliper pedal, caliper controller instructions, and/or vehicle system controller instructions and/or information.

In response to a request to move vehicle 225, vehicle system controller may obtain a driver demand power or torque, or a power or torque request from a driver demand pedal or other device. Vehicle system controller 255 then allocates a fraction of the requested driver demand power or torque to the engine to generate and the remaining fraction of driver demand power or torque for the electric machine 240 or BISG to generate. Vehicle system controller 255 requests the engine power from engine controller 12 and the electric machine power from electric machine controller 252. If the electric machine power plus the engine power is less than a transmission input power threshold (e.g., a power input threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative electric machine power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and friction calipers 218 provided via engine controller 12, electric machine controller 252, transmission controller 254, and caliper controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine speed reducing power or negative engine power may be provided by rotating the engine with the engine generating power that is insufficient to rotate the engine. Thus, the engine may generate a slowing power via operating at a low power while combusting fuel, with one or more cylinders deactivated (e.g., not combusting fuel), or with all cylinders deactivated and while rotating the engine. The amount of engine slowing power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from field and/or armature windings of electric machine 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254, engine controller 12, and vehicle system controller 255, may also receive addition transmission information from sensors 277, which may include but are not constrained to pump output line pressure sensors, transmission hydraulic pressure sensors (e.g., gear clutch fluid pressure sensors), ISG temperature sensors, and BISG temperatures, gear shift lever sensors, ambient temperature sensors, trailer present sensor, and vehicle suspension sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Caliper controller 250 receives wheel speed information via wheel speed sensor 221 and vehicle slowing requests from vehicle system controller 255. Caliper controller 250 may also receive vehicle slowing pedal position information from caliper application pedal sensor 154 shown in FIG. 1 directly or over CAN 299. Caliper controller 250 may provide caliper actuation responsive to a wheel power command from vehicle system controller 255. Caliper controller 250 may also provide anti-lock and vehicle stability caliper activation to increase vehicle stability. As such, caliper controller 250 may provide a wheel power threshold (e.g., a threshold negative wheel power not to be exceeded) to the vehicle system controller 255 so that negative ISG power does not cause the wheel power threshold to be exceeded. For example, if caliper controller 250 issues a negative wheel torque threshold of 50 N-m, electric machine power is adjusted to provide less than 50 N-m (e.g., 49 N-m) of negative torque at the wheels, including compensating for transmission gearing.

The system of FIGS. 1 and 2 provides for a vehicle system, comprising: an internal combustion engine; an electric machine; a traction battery; a human/machine interface; and a controller including executable instructions stored in non-transitory memory that cause the controller to exit a vehicle drive mode associated with biasing at least a portion of driver demand torque or power to the electric machine in response to a temperature of the electric machine exceeding a threshold temperature or a rate of temperature increase of the electric machine exceeding a threshold rate of temperature increase. In a first example, the vehicle system further comprises additional executable instructions stored in non-transitory memory that cause the controller to recommend activation of a vehicle operating mode where the electric machine is deactivated in response to a prediction that the temperature of the electric machine will exceed the threshold temperature according to a predetermined travel route of a vehicle. In a second example that may include the first example, the vehicle system further comprises additional executable instructions stored in non-transitory memory that cause the controller to enter a vehicle drive mode that includes deactivating regenerative vehicle slowing in response to the rate of temperature increase of the electric machine exceeding the threshold rate of temperature increase. In a third example that may include one or both if the first and second examples, the vehicle system further comprises additional executable instructions stored in non-transitory memory that cause the controller to enter a vehicle drive mode that includes deactivating charging of the traction battery in response to the rate of temperature increase of the electric machine exceeding the threshold rate of temperature increase. In a fourth example that may include one or more of the first through third examples, the vehicle system further comprises additional executable instructions stored in non-transitory memory that cause the controller to recommend exiting the vehicle drive mode associated with biasing at least a portion of driver demand torque or power to the electric machine via the human/machine interface. In a fifth example that may include one or more of the first through fourth examples, the vehicle system further comprises additional executable instructions stored in non-transitory memory that cause the controller to increase a fraction of driver demand torque provided via the internal combustion engine in response to the rate of temperature increase of the electric machine exceeding the threshold rate of temperature increase. In a sixth example that may include one or more of the first through fifth examples, the vehicle system further comprises additional executable instructions stored in non-transitory memory that cause the controller to decrease a fraction of driver demand torque provided via the electric machine in response to the rate of temperature increase of the electric machine exceeding the threshold rate of temperature increase. In a seventh example that may include one or more of the first through eighth examples, the vehicle system further comprises additional executable instructions stored in non-transitory memory that cause the controller to lower a rate of charging of the traction battery via the electric machine in response to the rate of temperature increase of the electric machine exceeding the threshold rate of temperature increase.

Referring now to FIG. 3, plots of an example engine operating sequence according to the method of FIG. 4 are shown. The engine operating sequence that is shown in FIG. 3 may be provided via the system of FIGS. 1 and 2 in cooperation with the method of FIG. 4. The vertical lines at times t0-t4 represent times of interest during the engine operating sequence. The plots shown in FIG. 3 are aligned in time.

The first plot from the top of FIG. 3 is a plot of a state of an adaptive electric machine application mode versus time. The vertical axis represents the state of the adaptive electric machine application mode and the adaptive electric machine application is activated when trace 302 is at a higher level that is near the vertical axis arrow. The adaptive electric machine application mode is not activated when trace 302 is at a lower level that is near the horizontal axis. Baseline control values are output when the adaptive electric machine application mode is not active. Adapted control values are output when the adaptive electric machine application mode is activated.

The second plot from the top of FIG. 3 is a plot of high voltage battery mode versus time. The vertical axis represents high voltage battery mode and the high voltage battery is in a charge depletion (CD) mode when trace 304 is at a higher level that is near the vertical axis arrow. The high voltage battery is in a charge sustain (CS) mode when trace 304 is at a lower level that is near the horizontal axis. Trace 304 represents the high voltage battery state. The horizontal axis represents time and time increases from the left side of the plot to the right side of the plot.

The third plot from the top of FIG. 3 is a plot of estimated vehicle mass (e.g., the vehicle mass plus any additional load that is applied to the vehicle) versus time. The vertical axis represents vehicle mass and vehicle mass increases in the direction of the vertical axis arrow. The horizontal axis represents time and time increases from the left side of the plot to the right side of the plot. Trace 306 represents the vehicle mass amount. Horizontal line 350 represents mass of a vehicle with two representative passengers and no additional load other than the two representative passengers.

The fourth plot from the top of FIG. 3 is a plot of a regenerative vehicle slowing threshold (e.g., a maximum amount of power that may be generated via slowing the vehicle via the electric machine operating as a generator) versus time. The vertical axis represents the regenerative vehicle slowing threshold and the regenerative vehicle slowing threshold increases in the direction of the vertical axis arrow. The horizontal axis represents time and time increases from the left side of the plot to the right side of the plot. Trace 308 represents the regenerative vehicle slowing threshold.

The fifth plot from the top of FIG. 3 is a plot of high voltage battery state of charge (SOC) versus time. The vertical axis represents the high voltage battery state of charge and the high voltage battery SOC increases in the direction of the vertical axis arrow. The horizontal axis represents time and time increases from the left side of the plot to the right side of the plot. Trace 310 represents the high voltage battery SOC. Horizontal line 351 represents a high voltage battery SOC where the vehicle enters charge sustain mode.

The sixth plot from the top of FIG. 3 is a plot of driver demand torque versus time. The vertical axis represents the driver demand torque and the driver demand torque increases in the direction of the vertical axis arrow. Trace 312 represents the driver demand torque or power.

The seventh plot from the top of FIG. 3 is a plot of internal combustion engine torque versus time. The vertical axis represents engine torque and engine torque increases in the direction of the vertical axis arrow. The horizontal axis represents time and time increases from the left side of the plot to the right side of the plot.

The seventh plot from the top of FIG. 3 is a plot of electric machine torque versus time. The vertical axis represents electric machine torque and electric machine torque increases in the direction of the vertical axis arrow. The horizontal axis represents time and time increases from the left side of the plot to the right side of the plot.

At time t0, the vehicle is not in adaptive electric machine application mode and the vehicle is in charge depletion mode. The estimated vehicle mass is above the baseline vehicle mass and the regenerative vehicle slowing threshold is above a middle level. The high voltage battery SOC is greater than threshold 351 and driver demand torque is at a low level, but it is increasing. Electric machine torque is providing a nearly constant fraction of the driver demand torque and the engine torque is gradually increasing with driver demand torque.

At time t1, the vehicle is switches into adaptive electric machine application mode and the vehicle remains in charge depletion mode. The estimated vehicle mass is unchanged and the regenerative vehicle slowing threshold is lowered so that the electric machine temperature may raise at a lower rate due to the estimated vehicle mass being greater than threshold 350. The high voltage battery SOC is greater than threshold 351 and driver demand torque continues to increase. The adaptive electric machine application state has changed in response to the increasing driver demand torque, which may be indicative of reaching loads where electric machine temperature may increase to conditions where electric machine output torque may be de-rated. The engine torque increases at time t1 in response to the adaptive electric machine application mode being entered. Additionally, electric machine torque decreases at time t1 in response to the adaptive electric machine application mode being entered so that electric machine temperature may not increase as fast as may be expected and so that the electric machine may not reach higher temperature.

At time t2, the vehicle is switches back out of adaptive electric machine application mode and the vehicle remains in charge depletion mode. The estimated vehicle mass is unchanged and the regenerative vehicle slowing threshold is raised so that the electric machine may provide additional torque to slow the vehicle since higher positive torque driver demands are not expected for at least some time. The high voltage battery SOC begins to increase as the high voltage battery begins to charge. The driver demand torque is zero. The engine torque and electric machine torque output are zero.

Between time t2 and time t3, mass is added to the vehicle and the high voltage SOC is increased due to charging of the high voltage battery (not shown). The driver demand torque begins to increase shortly before time t3 and electric machine torque is increased to meet the driver demand.

At time t3, the vehicle is switches into adaptive electric machine application mode for a second time and the vehicle remains in charge depletion mode. The estimated vehicle mass is unchanged and the regenerative vehicle slowing threshold is lowered even further than at time t1 so that the electric machine temperature may raise at an even lower rate due to the estimated vehicle mass increasing. The high voltage battery SOC is greater than threshold 351 and driver demand torque continues to increase. The adaptive electric machine application state has changed in response to the increasing driver demand torque and the increased vehicle mass. The engine torque increases at time t3 in response to the adaptive electric machine application mode being entered. Further, electric machine torque decreases at time t3 in response to the adaptive electric machine application mode being entered so that electric machine temperature may not increase as fast as may be expected and so that the electric machine may not reach higher temperature.

At time t4, the vehicle is switches back out of adaptive electric machine application mode for a second time and the vehicle remains in charge depletion mode. The estimated vehicle mass is unchanged and the regenerative vehicle slowing threshold is raised so that the electric machine may provide additional torque to slow the vehicle since higher positive torque driver demands are not expected for at least some time. The high voltage battery SOC begins to increase as the high voltage battery begins to charge. The driver demand torque is zero. The engine torque and electric machine torque output are zero.

In this way, torque output of an electric machine and an engine are adjusted in response to vehicle mass and increasing driver demand. In particular, the fraction of the driver demand torque that is generated by the internal combustion engine is increased and the fraction of driver demand torque that is generated via the electric machine is decreased in an effort to reduce electric machine temperature and a rate of electric machine temperature increase.

Referring now to FIG. 4, a method for adapting operation of an electric machine of a hybrid vehicle is shown. At least portions of method 400 may be implemented as executable controller instructions stored in non-transitory memory. Method 400 may operate in cooperation with the system of FIGS. 1 and 2. Additionally, portions of method 400 may be actions taken in the physical world via the controller to transform an operating state of an actuator or device.

At 402, method 400 determines vehicle operating conditions. Vehicle operating conditions may be determined or estimated via the various sensors described herein. Vehicle operating conditions may include, but are not constrained to vehicle speed, engine speed, catalyst temperature, driver demand torque, diver demand pedal position, engine temperature, and ambient temperature and pressure. Method 400 proceeds to 404.

At 404, method 400 judges if selected entry conditions are met for entering adaptive electric machine application state and proceeding to step 406. In one example, selected entry conditions may include one or more of the following conditions, but the selected entry conditions are not constrained those that are recited herein. Selected entry conditions may include the vehicle operating in a charge depletion mode, high voltage battery SOC greater than a threshold SOC, driver demand increasing over a predetermined actual total number of predetermined plurality of time intervals (e.g., 10 seconds, 30 seconds, 60 seconds, and 300 seconds), electric machine temperature increasing over a predetermined plurality of time intervals, a trailer being connected to the vehicle.

Method 400 may also apply preemptive or forecast operating conditions as a basis for proceeding to step 406. For example, method 400 may determine a travel route for the vehicle via the vehicle's navigation system, and based on travel route data (e.g., road grades, posted speeds, etc.) the travel route, vehicle mass, and weather conditions (e.g., wind speeds, ambient temperatures and pressures), method 400 may estimate the load that the vehicle will experience along the travel route and estimate electric machine temperature along the travel route via applying temperature models of the electric machine. If method 400 forecasts the electric machine to exceed a threshold temperature while the vehicle travels along the travel route, method 400 may judge that operating conditions to enter adaptive electric machine application mode are met and method 400 may proceed to 406.

Additionally, method 400 may apply the final destination of the vehicle based on travel route guidance to determine an expected remaining time that the vehicle will be driven. Method 400 may choose to continue to operate the vehicle in charge deplete mode without any additional biasing of driver demand torque to the engine and from the electric machine due to the trip duration being short enough that the electric machine may not be expected to reach a de-rated state. This information may be communicated to a vehicle's driver. For example, if a travel destination is in the vehicles navigation system, the navigation system may communicate via a human/machine interface with the vehicle's driver. The vehicle's driver may agree to a power management equation whereby they would get additional power to that destination, thereby requesting acknowledgement that the vehicle would be parked for a certain period of time once at that destination. The vehicle may remain activated once the vehicle reaches the destination so that electric machine temperature may be reduced to a desired level.

Additionally, in some situations, travel route or road analysis may lead to an energy consumption balance or negotiation between the vehicle driver and the vehicle where they agree to be constrained to a lower speed on uphill sections for example in exchange for being able to consume more energy and/or create more heat on other portions of the travel route. For example, if a vehicle's driver knows they will impede traffic in the city and on highway entrance ramps, they can agree to constrain their freeway speed to balance energy consumption and heat creation to allow them more power in the city and on highway entrance ramps.

The entry conditions for adaptive electric machine application may also include geo-fencing areas such as highway entrance ramps and intersections to enable full powertrain power for those conditions in exchange for more restrictive de-rate strategies in other geo-fenced areas such as highs.

If method 400 judges that conditions have been met to enter adaptive electric machine application mode, the answer is yes and method 400 proceeds to 406.

At 406, method 400 adjusts a portion of driver demand torque that is generated by the internal combustion engine to increase proportionately to a temperature rate of increase of the electric machine and to reduce electric machine torque by an equivalent amount of the torque increase of the internal combustion engine. The electric machine and internal combustion engine generated the requested driver demand torque. For example, if the temperature of the electric machine increased by ten percent, the torque output of the internal combustion engine may be increased by ten percent (e.g., 30 Newton-meters) and output of the electric machine may be reduced by the same amount (e.g., 30 Newton-meters) so that the requested driver demand torque continues to be generated by the electric machine and the internal combustion engine even though the torque that is generated by the engine and the electric machine are adjusted.

Once entry conditions are met at step 404, method 400 begins increasing the fraction of engine torque or power from a baseline torque or power value for a particular driver demand at a particular engine speed and continues increasing the engine torque or power according to the temperature of the electric machine and the rate of temperature increase of the electric machine. The electric machine output torque or power is reduced beginning from a baseline electric machine torque or power output level as the engine torque or power output is increased. The baseline torque or power levels for the engine and the electric machine may be stored in controller memory and they may be indexed or referenced via operating conditions such as but not constrained to driver demand torque and vehicle speed. Method 400 proceeds to 408.

At 408, method 400 may reduce or deactivate regenerative vehicle slowing or speed reduction. In one example, the regenerative vehicle slowing force may be reduced in proportion to a change in electric machine temperature, or alternatively or in addition, as a function of electric machine temperature. Thus, vehicle slowing commands or requests that are made via the caliper application pedal may increase friction caliper force as a function of electric machine temperature and reduce regenerative vehicle slowing via the electric machine. Alternatively, regenerative vehicle slowing may be deactivated. Method 400 proceeds to 410.

At 410, method 400 reduces advantageous charging of the high voltage battery when the engine is running (e.g., rotating and combusting fuel). The high voltage battery may be advantageously charged when the battery SOC is low and the engine and electric machine have output capacity that is greater than the power to meet driver demand torque and high voltage loads that are generated via high voltage bus power consumers (e.g., climate control system, PTC heater, etc.). In one example, the advantageous charging of the high voltage battery may be reduced in proportion to a change in electric machine temperature, or alternatively or in addition, as a function of electric machine temperature. Method 400 proceeds to 412.

At 412, method 400 may recommend alternative travel routes to a requested travel destination that may be considered less aggressive travel routes. Less aggressive travel routes may include but are not constrained to travel routes with fewer and/or less road grade changes, fewer curves, and lower vehicle speed. Thus, instead of recommending a travel route that is a shortest distance to a requested destination, method 400 may recommend travel routes with fewer road grade changes (e.g., the actual total number of times the road grade changes are fewer) and travel routes where the road grade magnitudes are smaller than that of the shortest travel route. Method 400 proceeds to 414.

At 414, method 400 may recommend that the drive change to a lower performance vehicle operating mode. For example, method 400 may recommend an economy mode where driver demand changes at a slower rate for changes in driver demand pedal and where transmission gear changes occur at lower vehicle speeds as compared to when the vehicle is operating in a performance mode. Method 400 proceeds to 416.

At 416, method 400 judges whether or not the derivative of electric machine temperature has stabilized (e.g., changes by less than a threshold amount over a predetermined amount of time) and if electric machine temperature is less than a threshold temperature. If so, the answer is yes and method 400 proceeds to 418. Otherwise, the answer is no and method 400 returns to 406.

At 418, method 400 gradually increases the fraction of torque or power that is generated via electric machine toward the baseline torque or power level for the electric machine. Torque or power output of the engine is reduced equal to a magnitude of the electric machine torque or power increase. Method 400 may increase the fraction of electric machine power as a function of time or other vehicle operating condition. Method 400 returns to 404.

In this way, electric machine torque or power output may be adjusted while driver demand torque or power is met when electric machine temperature increases or is forecast or predicted to increase above a threshold level. Engine torque or power adjustments are made to compensate for electric torque or power adjustments.

Thus, the method of FIG. 4 provides for a method for operating a vehicle, comprising: increasing a first fraction of a driver demand torque generated via an internal combustion engine relative to a baseline fraction of torque generated via the internal combustion engine and decreasing a second fraction of the driver demand torque generated via an electric machine relative to a baseline fraction of torque generated via the electric machine in response to a driver demand torque increasing over a plurality of time intervals. In a first example, the method includes where the increase in the first fraction and the decrease in the second fraction is performed in further response to the vehicle being in a charge depletion mode. In a second example that may include the first example, the method includes where the increase in the first fraction and the decrease in the second fraction is performed in further performed response to a trailer being attached to the vehicle. In a third example that may include one or both of the first and second examples, the method further comprises decreasing an amount of regenerative vehicle slowing power provided via the electric machine in response to a predetermined travel route of the vehicle. In a fourth example that may include one or more of the first through third examples, the method includes where the increase in the first fraction and the decrease in the second fraction is performed in further performed response to a mass of the vehicle increasing. In a fifth example that may include one or more of the first through fourth examples, the method includes where each of the plurality of time intervals is a different time interval than other time intervals included in the plurality of time intervals. In a sixth example that may include one or more of the first through fifth examples, the method further comprises performing regenerative vehicle slowing solely in response to applying a pedal.

The method of FIG. 4 also provides for a method for operating a vehicle, comprising: increasing a first fraction of a driver demand torque generated via an internal combustion engine relative to a baseline fraction of torque generated via the internal combustion engine and decreasing a second fraction of the driver demand torque generated via an electric machine relative to a baseline fraction of torque generated via the electric machine in response to an increase in a mass of the vehicle. In a first example, the method includes where the increase in the first fraction and the decrease in the second fraction occur while the vehicle is operating in a charge sustaining mode. In a second example that may include the first example, the method further comprises reducing or deactivating a lift pedal regenerative vehicle speed reduction in response to a rate of change in a temperature of the electric machine exceeding a threshold rate of change. In a third example that may include one or both of the first and second examples, the method further comprises recommending a less aggressive travel route in response to the increase in the mass of the vehicle. In a fourth example that may include one or more of the first through third examples, the method further comprises recommending a powertrain mode change in response to the increase in the mass of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
    increasing a first fraction of a driver demand torque generated via an internal combustion engine relative to a baseline fraction of torque generated via the internal combustion engine and decreasing a second fraction of the driver demand torque generated via an electric machine relative to a baseline fraction of torque generated via the electric machine in response to the driver demand torque increasing over a plurality of time intervals.

2. The method of claim 1, where increasing the first fraction and decreasing the second fraction is performed in further response to the vehicle being in a charge depletion mode.

3. The method of claim 1, where increasing the first fraction and decreasing the second fraction is performed in further performed response to a trailer being attached to the vehicle.

4. The method of claim 1, further comprising decreasing an amount of regenerative vehicle slowing power provided via the electric machine in response to a predetermined travel route of the vehicle.

5. The method of claim 1, where increasing in the first fraction and decreasing in the second fraction is performed in further performed response to a mass of the vehicle increasing.

6. The method of claim 1, where each of the plurality of time intervals is a different time interval than other time intervals included in the plurality of time intervals.

7. The method of claim 1, further comprising performing regenerative vehicle slowing solely in response to applying a pedal.

* * * * *